(12) United States Patent
Guimarães et al.

(10) Patent No.: US 8,747,674 B2
(45) Date of Patent: Jun. 10, 2014

(54) PROCESS FOR TREATMENT OF WATER/OIL EMULSIONS

(75) Inventors: Regina Celia Lourenco Guimarães, Rio de Janeiro (BR); Bianca Machado da Silva Ferreira, Rio de Janeiro (BR); Maria de Fatima Pereira dos Santos, Rio de Janeiro (BR); Ricardo Andre Guarnieri, Rio de Janeiro (BR); Montserrat Fortuny Heredia, Aracaju (BR); Cláudio Dariva, Aracaju (BR); Alexandre Ferreira Santos, Aracaju (BR); Rita de Cássia Bomfim Lemos, Aracaju (BR); Lisiane dos Santos Freitas, Aracaju (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 494 days.

(21) Appl. No.: 12/980,179

(22) Filed: Dec. 28, 2010

(65) Prior Publication Data

US 2011/0186515 A1   Aug. 4, 2011

(30) Foreign Application Priority Data

Dec. 28, 2009  (BR) .................................... 0905253

(51) Int. Cl.
*B01D 11/04* (2006.01)
*B01D 17/04* (2006.01)
*B01D 17/05* (2006.01)

(52) U.S. Cl.
USPC ........... 210/643; 208/188; 210/708; 210/650; 210/737; 210/738; 210/749; 210/774; 210/787; 210/788; 210/806; 516/141; 516/143; 516/194; 516/195; 516/197

(58) Field of Classification Search
CPC .... B01D 11/04; B01D 11/0419; B01D 17/04; B01D 17/042; B01D 17/047; B01D 17/05
USPC ......... 210/634, 639, 704, 708, 737, 738, 774, 210/787, 788, 748.07, 806, 650, 643, 695, 210/749; 516/142–195, 141, 197; 208/188
See application file for complete search history.

(56) References Cited

U.S. PATENT DOCUMENTS 4,107,057 A * 8/1978 Dill et al. ...................... 507/226
4,582,629 A * 4/1986 Wolf ............................. 516/143
(Continued)

FOREIGN PATENT DOCUMENTS

| WO | 01/12289 A1 | 2/2001 |
| WO | 2006/111712 A2 | 10/2006 |
| WO | 2006/131699 A1 | 12/2006 |
| WO | 2007/138307 A2 | 12/2007 |

OTHER PUBLICATIONS

Christopher J. Bowlas, et al., Liquid-Crystalline Ionic Liquids, Chem. Commun., 14, pp. 1625-1626 (1996).

(Continued)

*Primary Examiner* — Joseph Drodge
(74) *Attorney, Agent, or Firm* — Sughrue Mion, PLLC

(57) ABSTRACT

A process for the treatment of water/oil (W/O) emulsions is described which includes the addition of an ionic liquid, under heating, to a water/oil emulsion containing between 0.5% and 85% of water per volume as a dispersion phase, until the concentration of the ionic liquid in the emulsion remains within the range of 0.01 μL/g to 100 μL/g. The ionic liquid used is a salt of a general $C^+A^-$ formula in a liquid state at temperatures below 150° C., where $A^-$ is an anion and $C^+$ is a cation, which has at least a hydrophobic alkyl chain connected to a cation group. The heating method includes conventional heating and heating via microwaves. In the heating via microwaves, the salts of the general $C^+A^-$ formula present synergic behavior in separation efficiency in relation to conventional heating.

22 Claims, 4 Drawing Sheets

(56) References Cited

U.S. PATENT DOCUMENTS

| | | | |
|---|---|---|---|
| 6,350,721 B1* | 2/2002 | Fu et al. | 507/242 |
| 7,705,058 B2* | 4/2010 | Coutinho et al. | 516/194 |
| 7,914,688 B2* | 3/2011 | Anderson et al. | 210/748.07 |
| 8,333,809 B2* | 12/2012 | Konig et al. | 23/295 R |
| 2002/0185445 A1* | 12/2002 | Varadaraj | 210/708 |
| 2008/0221226 A1 | 9/2008 | Coutinho et al. | |
| 2009/0101592 A1* | 4/2009 | Anderson et al. | 210/748 |
| 2010/0243532 A1* | 9/2010 | Myers et al. | 208/254 R |
| 2011/0155647 A1* | 6/2011 | Serban et al. | 208/188 |
| 2012/0261312 A1* | 10/2012 | Flores Oropeza et al. | 208/188 |

OTHER PUBLICATIONS

John D Holbrey, et al., "The Phase Behaviour of 1-Alkyl-3-Methylimidazolium Tetrafluoroborates; Ionic Liquids and Ionic Liquid Crystals", J. Chem. Soc., Dalton Trans., 13, pp. 2133-2139 (1999).

Montserrat Fortuny, et al., "Effect of Salinity, Temperature, Water Content, and pH on the Microwave Demulsification of Crude Oil Emulsions", Energy & Fuels, vol. 21, pp. 1358-1364 (2007).

* cited by examiner

PROCESS FOR TREATMENT OF WATER/OIL EMULSIONS

This application claims foreign priority to Brazilian Patent Application PI 0905253-4, filed Dec. 28, 2009, the contents of which are incorporated herein by reference.

FIELD OF THE INVENTION

This invention is directed to the field of treatment processes for water/oil (or "W/O") emulsions, more specifically to a treatment process especially suited to stable emulsions with the help of ionic liquids and heating. The inventive processes include the treatment of these water/oil emulsions with the help of ionic liquids in which heating is performed using microwaves.

BACKGROUND OF THE INVENTION

Ionic liquids (ILs) comprise a specific class of molten salts composed of organic cations joined both to organic or inorganic anions. They have a strong chemical similarity to molten inorganic salts and the main difference is that they are liquid at room temperature, or conventionally below 100° C.

The chemical structure of ionic liquids allows for many combinations of anions and cations, making it feasible to obtain compounds with varied properties and which can be designed for a given application.

The diverse combinations between anions and cations also influence the physical-chemical properties of ionic liquids. In general, the type of anion determines more strongly the thermal stability and its miscibility in water. Examples of this latter property, which can be mentioned are hydrophilic anions (such as chloride and iodide), which grant miscibility to ILs in any proportion with water, while the $PF_6$ anion limits the solubility of ILs in water.

On the other hand, the cation mainly influences properties such as viscosity, melting point and density, amongst others.

Recently, the study of the interfacial properties of ionic liquids has received a lot of attention. For a series of ionic liquids, it was observed that an interfacial behavior and aggregation behavior similar to those exhibited by the tensoactive agents of the cationic chain. See Bowlas, C. J. et al., *Liquid-crystalline ionic liquids*, CHEM. COMMUN., 14, pp. 1625-1626, 1996; and Holbrey, J. D. & Seddon, K. R. J., *The Phase Behaviour of 1-alkyl-3-methylimidazolium tetrafluoroborates*, J. CHEM. SOC., *Dalton Trans.*, 13, pp. 2133-2139, 1999.

Due to the known tensoactive capacity of certain ionic liquids, one can conclude that ionic liquids are fluids with the potential to act as demulsifiers, or emulsion breakers, which are nothing more than tensoactive destabilizers of emulsions; and that the mixing of ionic liquids is a process resulting from both the length of the hydrocarbon chains of the cation and the nature and size of the anion.

Demulsifying chemical agents have been employed in the breakup of petroleum emulsions. The efficiency of this treatment depends on the viscosity of the medium as well as the stability of the emulsion, which in turn is influenced by the composition of the natural tensoactive agents, water content and concentration of salts, the distribution of the size of water droplets as well as experimental conditions such as temperature, age of the emulsion, etc.

For emulsions generated from heavy oils, these treatments have not been very efficient when more severe conditions are required for the destabilization of emulsions, in particular in terms of temperature, resulting in a high consumption of inputs and energy.

A recent technology is based on the application of radiation in the microwave range. Using microwave irradiation, it is possible to accelerate the heating up of petroleum emulsions, aiding the separation of the water-oil phases via thermal effects. In addition to this, it is believed that the microwaves interact with the polar types that make up the interfacial film, which protects the emulsionated droplets, hence encouraging non-thermal effects capable of modifying the conformation of tensoactive agents in the interface, hence favoring destabilization.

The article by Fortuny, M. et al., *Effect of salinity, temperature, water content, and pH on the microwave demulsification of crude oil emulsions*, ENERGY & FUELS, 21, pp. 1358-1364, 2007, constitutes one of the few investigations into the petroleum field which seeks to understand the effects of the characteristics of water/oil (W/O) emulsions on performance of treatment via microwave energy irradiation under controlled conditions.

The effect that the microwaves cause is based on the reorganization of the loads of polar molecules (polarization) and the free ions of the dielectric materials induced by the electric field of the radiation. This type of effect is known as dielectric heating and may be obtained by two classic mechanisms of interaction between microwaves and the material: the rotation of dipoles and ionic conduction.

Ionic liquids, as they are molten salts, have dielectric properties that favor their interaction with electromagnetic waves. ILs have a high capacity to absorb microwaves and subsequent transformation of this electromagnetic energy into heat. In fact, the constant dielectric of ionic liquids quantifies the capacity of the material to store electromagnetic energy. Hence, substances with constant high dielectrics tend to absorb microwave irradiations well.

Patent literature registers a small number of documents relating to microwave applications and ionic liquids in the field of water/oil emulsion treatment.

In international publication WO 2001/012289, a method is described to treat an emulsion which comprises water droplets in an organic liquid in order to separate the water and the organic liquid, in which the emulsion is subjected to microwave radiation at a frequency of 300 MHz to 100 GHz, in order to heat up the droplets selectively. At the frequency chosen, the droplets tend to transform the electromagnetic radiation into heat.

In U.S. Patent Application Publication No. 2008/0221226, from the same applicant, a method is described for the treatment of W/O emulsions with the help of microwaves in order to systematize a series of stages of the process intended to provide, for a crude oil, at least 90% emulsion treatment efficiency.

In international publication WO 2006/111712, the application of ionic liquids as surfactants in the stabilization of water/oil (W/O) or oil/water (O/W) emulsions and microemulsions is described. The ionic liquid employed as surfactant is a salt of a general formula (I) $C^+ A^-$ which exists in a liquid state at a temperature of 150° C. and at least one of a cation $C^+$ and an anion $A^-$ comprise a pendant hydrophobic group attached to an ionic head group, and $A^-$ represents an anion containing phosphorus or an alkyl sulfate anion of a general formula $ROSO_3^-$ where R is an alkyl group with at least 8 carbon atoms.

In international publication WO 2006/131699 a process is described to break an emulsion of an ionic liquid which is a salt in a liquid state at a temperature lower than 150° C. and an oil, the process includes the phases of:

a) Irradiating the emulsion with microwave radiation;
b) Separating the emulsion in a phase comprising an ionic liquid and an oil phase; and
c) Recovering at least one of the phases.

Emulsions including ionic liquids may be formed in processes in which this compound is used as an extractor agent of polyaromatic and sulfated compounds, or as a catalyst in organic reactions. In these processes, it is interesting to stimulate the swift separation of the phase comprising the ionic liquid for subsequent purification and re-use.

International publication WO 2007/138307 presents an extraction process for sulfated acid types of matrixes of crude petroleum or distillates of petroleum in which basic ionic liquids are used as extractor agents.

The basicity of the ionic liquid can be verified for specific functional groups incorporated in each cation and/or anion portion of the molecule.

Therefore, despite the range of documents available in literature, a treatment process for W/O emulsions in which separation is effective and at the same time with low energy consumption, is still necessary.

The process described below sets out the treatment of W/O emulsions in the presence of an ionic liquid which acts as a demulsifier and a heating source in which heating to enable the breaking of the emulsion is carried out using conventional thermal means or using radiofrequency energy such as microwaves. The application of ionic liquids as demulsifying agents is particularly useful when combined with microwave irradiation, enabling the aiming of microwave radiation at the W/O interface, favoring the destabilization of the protective film responsible for the stability of the emulsions.

BRIEF SUMMARY OF THE INVENTION

As an overview, the process of this invention for the treatment of stable W/O emulsions comprises the phases of:
(a) Adding, by stirring, an effective proportion of a general formula $C^+A^-$ salt in a liquid state at temperatures of less than 150° C., in which $A^-$ is an anion and $C^+$ is a cation which has at least a hydrophobic alkyl chain attached to a cationic group, to a W/O emulsion containing between 0.5% and 85% per volume of water as the dispersion phase in an oily phase, the salt from the $C^+A^-$ formula being used as such or dissolved in water or in an organic solvent, obtaining a salt mixture of the $C^+A^-$ formula and W/O emulsion;
(b) Heating up the mixture obtained in (a) for a period of between 5 seconds and 120 minutes at temperatures of between 25° C. and 270° C. under pressures of between 0.5 bar and 200 bar to carry out the demulsifying; and
(c) Separating the mixture heated in (b) using separator equipment in two distinct phases: a first phase containing mostly water and a second phase containing oil.

An optional stage is the recovery of the ionic liquid for reuse.

Hence, the invention specifies a treatment process for W/O emulsions by adding an ionic liquid to this emulsion, heating this up under demulsifying conditions, separation in separators and collection of the components, and said process can occur in a batch or a continuous mode.

The invention also specifies a treatment process for W/O emulsions by adding an ionic liquid to this emulsion in which the heating of the emulsion that one wishes to separate is performed with the help of radiofrequency energy such as microwave energy, such that the microwave radiation is aimed at the W/O interface, favoring the destabilization of the protector film responsible for the stability of the emulsions.

The invention also specifies a treatment process for W/O emulsions via the addition of an ionic liquid to this emulsion, the process applicable to:
(a) Emulsions containing salts in a proportion of zero to 280,000 mg/L;
(b) Emulsions containing between 0.5% and 85% per volume of water; and
(c) For droplet sizes of from 0.01 µm to 1000 µm.

The accompanying figures are included to illustrate and provide a further understanding of the method and system of the invention. Together with the description, the figures serve to explain the principles of the invention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated drawings. Understanding that these drawings depict only typical embodiments of the invention (or features related to the invention) and are not therefore to be considered to be limiting of its scope, the invention will be described and explained with additional specificity and detail through the use of the accompanying drawings.

DETAILED DESCRIPTION OF THE INVENTION

Figure 1:
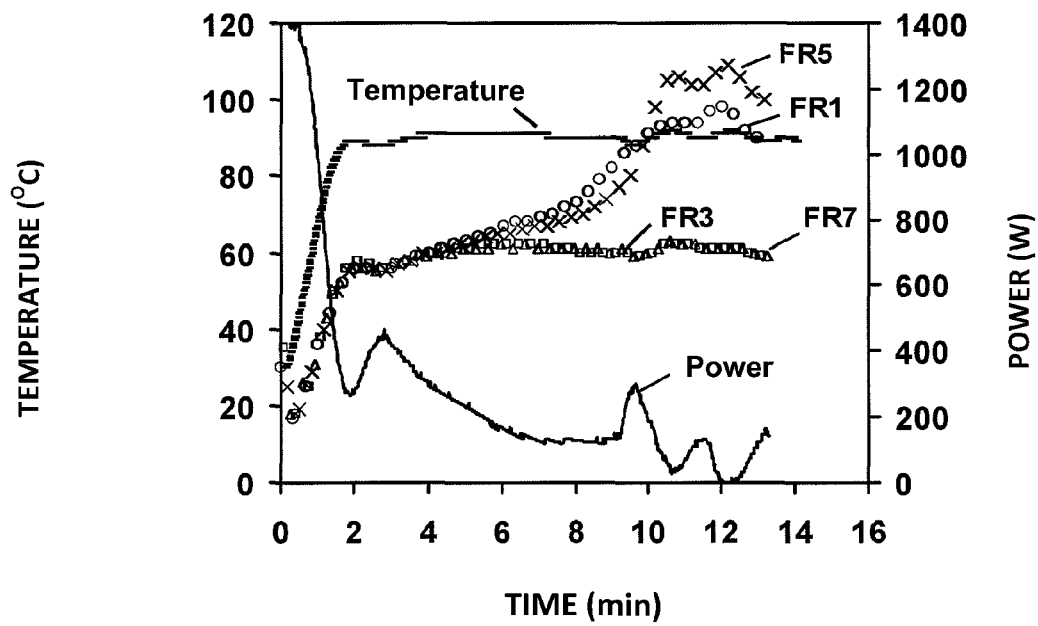
FIG. 1 demonstrates the heating and power curves over time applied to Example 1.

It is to be understood that both the foregoing general description and the following detailed description are exemplary and are intended to provide further explanation of the invention claimed.

This inventions concerns a treatment process for W/O emulsions in the presence of Ionic Liquids (ILs) in which the ionic liquid is added to the W/O emulsion with subsequent heating and separation of the emulsion components, which can then be recovered by any recognized means. Optionally, the ionic liquid is recovered for reuse. The process according to this invention comprises the phases of:
(A) Adding, by stirring, an effective proportion of a general formula $C^+A^-$ salt, which is in a liquid state at temperatures of less than 150° C., in which $A^-$ is an anion and $C^+$ is a cation which has at least a hydrophobic alkyl chain attached to a cationic group, to a W/O emulsion containing between 0.5% and 85% per volume of water as the dispersion phase in an oily phase, obtaining a salt mixture of the formula $C^+A^-$ salt and W/O emulsion, wherein the formula $C^+A^-$ salt can be used as such (i.e., directly added without the use of a solvent) or can be dissolved in water or in an organic solvent;

(B) Heating up the mixture obtained in (A) for a period of between 5 seconds and 120 minutes at temperatures of between 25° C. and 270° C. under pressures of between 0.5 bar and 200 bar to carry out the demulsifying; and (C) Separating the mixture heated in (B) using separator equipment in two distinct phases: a first phase containing mostly water and a second phase containing oil.

An optional phase is the recovery of the ionic liquid for reuse.

Given the simultaneous affinity of the oily and aqueous phases of ILs, the emulsions covered by the scope of the inventions are those which comprise an aqueous phase dispersed in a continuous oily phase, either with synthetic or natural emulsions. As the aqueous phase according to the invention, one understands this to range from distilled water to saline solutions containing salt proportions of up to 280,000 mg/L.

The process is especially designed for so-called stable emulsions with a droplet size of from 0.01 μm to 200 μm. The proportion of water in emulsions varies from 0.5% to 85% volume with typical values of from 30% to 50% per volume.

The oily phase comprises mineral oily phases such as crude oil, petroleum and distillates, synthetic oils and oils of vegetable origin, such as edible oils, either in their raw or refined state, or any other greases such as oils of animal origin. In the case of mineral oily phases such as petroleum, petroleum with an API grade within the range of 7 to 30 can be treated using the process herein.

ILs have a demulsifying potential and are considered useful for the W/O emulsion treatment process of this invention for salts with a general formula. These exist in a liquid state at temperatures below 150° C., where $A^-$ is an anion and $C^+$ a cation which has at least one hydrophobic alkyl chain connected to a cation group. In these salts, the amphiphilic character is provided by the cation.

Amongst the ILs useful for the purposes of the invention, though not limited to these, there is mentioned the compounds of heteroaromatic cations such as n-alkylpyridinium, 1,3-dialkyl-imidazolium, 1,2,3-trialkyl-imidazolium, 1,1-dialkyl-piperidine, 1,1-dialkyl-pyrrolidinium and organic cations such as trialkylsulfonium, tetraalkylammonium or phosphonium and inorganic and organic anions such as $Cl^-$, $Br^-$, $I^-$, $BF_4^-$, $PF_6^-$, $NO_3^-$, $(CF_3SO_2)_2N^-$, $SbF_6^-$, $CF_3SO_3^-$, $HSO_4^-$, $CH_3SO_3^-$, $SCN^-$. Other organic anions of interest may be based on sulfates, sulfonates, phosphates, acetates and nitrates. The alkyl groups present have between 1 and 18 carbon atoms.

Preferentially, the ionic liquids used are tetrafluoroborate of 1-n-octyl-3-methylmidazolium and hexafluorophosphate of 1-n-octyl-3-methylimidazolium and hexafluorophosphate of 1-n-octyl-3-methylimidazolium as these present good separation efficiency.

Addition of the ionic liquid to the W/O emulsion is carried out until the concentration of the ionic liquid in the emulsion reaches values in the range of 0.01 μL/g to 100 μL/g.

The ILs useful to the invention can be applied in the form of mixed systems such as mixture of ILs and mixtures of ILs with a conventional demulsifier in any proportion, since both ILs and conventional demulsifying products have similar action mechanisms.

Generally, ionic liquids are used dissolved in a solvent in a proportion varying between 1:0.01 and 1:100 per volume with the solvent selected from an aromatic, aliphatic or hydroxylated organic solvent including alcohols and water, in which the aromatic solvent preferentially used is benzene. The ionic liquid may also be used without a solvent.

Although the invention has been described in a general way by the batch process, it is clear to specialists that this applies with no significant modification, to continuous processes. These processes are conducted on a test-bench or industrial scale based on adaptation within the realm of the technicians in the field.

Whenever microwaves are used as a heating source of the emulsionated medium, the microwave equipment is any device containing a microwave emitter issuing radiation at a frequency of between 1000 MHz and 300,000 MHz.

Pursuant to the invention, conventional heating means the use of thermal exchange and electric resistance devices based on the mechanisms of conduction and convection, including heating using the action of electricity.

The applicable temperature for this process ranges from 25° C. to 270° C., which covers both the application in primary processing as well as desalting performed in petroleum prior to refining.

Processing times range from 5 seconds to 120 minutes. Hence, these include both batch processes and continuous processes which involve low residence periods.

The process described here for the treatment of W/O emulsions with ionic liquids may be employed together with techniques of centrifuging, gravitational separation, ultrasound, hydrocyclones, electrostatic separation, filtration, separation via membrane or a combination of these techniques.

Though the tests refer solely to reduced pressures, it is not expected that pressure has a major influence on the demulsifying mechanism proposed. Hence, it is possible to apply ILs even in processes with high pressures. For this reason, absolute pressure conditions are those which range between zero and 20 MPa (0 to 200 bar) and are those which include values typically employed in petroleum primary processing units (in production units) and in desalting units (at refineries).

Just as conventional demulsifying products are used together with techniques of centrifuging, gravitational separation, ultrasound, etc., this invention covers the addition of ILs concomitantly with the use of separation processes equipped with conventionally used equipment.

The laboratory procedures presented below describe the preparation of emulsions, demulsifying tests and analysis of emulsions, subsequent to the addition of ionic liquids and/or exposure to microwave radiation employed in the examples described.

Preparation of Emulsions

Emulsions are prepared via intensive homogenization with a mechanical disperser using API 24.6 grade heavy petroleum as a continuous phase, and distilled water and brine (concentration of 50 g/L of NaCl) as the dispersion phase.

The synthesized emulsions have a water content varying between approximately 30%-50% per volume and an average droplet diameter of between 3 and 4 μm, this diameter corresponding to very stable emulsions. As a result of the high stability of the synthesized emulsions with a fixed granulometry, the formation of free water in the breaking process via microwaves is only observed with help from the addition of demulsifying agents. These results are observed in breaking tests via dielectric heating conducted at a constant temperature of 90° C. and a processing time of 30 minutes. Under these same conditions, emulsions with an average diameter of between 10-30 μm exhibited almost total separation of phases (water content of the residual emulsion <1.5%) in the breaking process via microwaves without the addition of a demulsifier.

Demulsifying Tests with Microwaves

Emulsion breaking tests were carried out in a microwave reactor in the presence and absence of ionic liquids or demulsifier typically used by Applicants.

Breaking tests via microwaves were conducted in a Synthos 3000 multimode microwave reactor from Anton Paar at a constant temperature set at values of between 65° C. and 120° C., and a processing time of between 13 and 30 minutes. In all tests, 4 quartz vessels were loaded onto an 8-position rotor, at positions 1, 3, 5 and 7. The rotor allows individual pressure and external temperature measurement for each vessel. All vessels were filled with an emulsion mass of 30 g. In addition to this, in the vessels located at positions 1 and 5, a known amount of ionic liquid or commercial demulsifier is added in accordance with the methodology presented below. Hence and for each test, in two vessels (1 and 5) the synergic effect of chemical agent and microwaves on the breaking efficiency is evaluated, whilst in the other two vessels (positions 3 and 7 of the reactor), solely the effect of microwaves on separation is assessed.

Conventional Demulsifier Tests

The breaking tests conducted under conventional heating were carried out in a thermostatic bath using water as a thermal fluid and quartz vessels typically used in microwave reactors.

Experimental conditions in the conventional heating tests are: temperature of 90° C. and processing time of 45 minutes. This processing time exceeds the amount used in microwave tests due to the conventional process being a much slower method of heating than dielectric heating for this type of system. In heating tests of synthesized petroleum emulsions with an API 24.6 grade oil, it was verified that such emulsions when inserted into quartz vessels reach a temperature of 90° C. after 15 minutes from the start of the thermal exchange. Hence the time of 45 minutes for conventional processing is set including 15 minutes for heating up the sample plus 30 minutes during which the sample is maintained at a set temperature.

Addition of Ionic Liquids and Demulsifier

In the tests presented in this report, ionic liquids such as tetrafluoroborate of 1-n-octyl-3-methylimidazolium (omimBF4) and hexafluorophosphate of 1-n-octyl-methylimidazolium (omimPF6) and the commercial demulsifier Dissolvan 942 (D942) were used as a control. It would, however, be clear to specialists that many other different ionic liquids and commercial demulsifiers would also be useful for the purposes of this invention, these variations being totally covered within the scope of this invention which is limited solely by the content of the attached claims.

To add such chemicals to synthesized emulsions, three distinct methods are used:

(a) Homogenization of the IL in the emulsion via manual mixing in centrifuging flasks (equivalent system to that used in bottle tests). In this system, the mixture consists of 90 g of emulsion and the addition of 100 μL of a solution of IL in benzene. This solution consists of a mixture of 2.01 g of IL and 1 mL of benzene. Proportions ranging from 1:0.01 to 1:100 per volume of IL/solvent are acceptable.

The solvent is an aromatic, aliphatic or hydroxylated solvent including alcohols and water. The use of solvent helps the mixing of the IL into the emulsion.

(b) Homogenization of the IL in the emulsion via mixing using a mechanical disperser. In this system, the mixture consists of 180 g of emulsion and the addition of 200 μL of IL solution in benzene, seeking to maintain the same proportion obtained in the previous stage.

(c) Homogenization of the IL free of added solvents or the D942 demulsifier in the form of solution in toluene (25% per vol.) in the emulsion by mixing using a mechanical disperser.

In this system the mixture consists of 90 g of emulsion and the addition of a known volume of IL or 90 g of emulsion and 20 μL of demulsifying solution based on D942.

Analysis of Emulsions after Testing

After the breaking tests, the samples were chilled for 10 min until they reached a temperature of 60° C. Following this, the samples were characterized in accordance with different methods as a result of the degree of advance of the separation process:

(a) Samples that do not present a free water formation: samples are taken from the upper part of the non-resolved emulsion, and the water content (potentiometric titration method using Karl Fischer reagent) and droplet size distribution (via laser diffraction) were ascertained. These ascertainments indicate the degree of advance of coalescence and/or gravitational sedimentation of the water droplets.

(b) Samples that present free water formation: the non-resolved oil and/or emulsion phase was totally sampled and characterized for water content. Based on this characterization, the separation efficiency (SE) can be calculated based on the following equation:

$$SE = \frac{TA_0 - TA_f}{TA_0}$$

Wherein: $TA_0$ and $TA_f$ represent the initial water content of the synthesized emulsion and water content of the non-resolved emulsion, respectively.

Below, the specific illustrative examples of the invention are presented.

EXAMPLES

Hereinafter, the present invention will be further specifically described with examples. However, the present invention is not limited to these examples.

Example 1

Example 1 illustrates the use of the microwave heating system with ionic liquid in two samples inserted into a reactor using omimBF4 ionic liquid as demulsifier and manual mixing and addition of IL solubilized beforehand in benzene, and distilled water as a dispersion phase of the emulsion.

The synthesized emulsion in this test presents the following initial properties: water content=31.7% and D (05)=3.5 μm. Processing time is 13.5 minutes.

D(0.5)=diameter associated with the midpoint of the particle-size distribution; the middlemost diameter that is larger than 50% of the diameters in the distribution and smaller than the other 50%.

FIG. 1 presents the applied power and heating curves given by infrared sensors and gas expansion of the microwave reactor throughout the experiment. It is worth pointing out that the gas sensor is immersed in the midst of the emulsion of the vessel of quartz located at position 1 and the IR sensor provides the temperature at the back outside of each vessel of quartz. Due to the high thickness of the vessel of quartz there are significant differences between the measurements of both sensors. When the system does not present any free water formation, the temperature of the gas sensor is around 30° C. higher than the temperature specified by the IR sensor.

As free water is formed in the system, this water accumulates at the bottom of the vessel absorbing a significant amount of microwave radiation which is transformed into heat as a result of the increase in temperature of the separated water. Hence, the formation of free water in this type of testing may be easily identified by the increase in temperature specified via the IR sensor.

FIG. 1 presents this type of behavior for vessels 1 and 5, in which IL was added. Applicants also note the distinct behavior of the heating curves as a result of the addition or not of IL.

The results observed in the heating curves are verified at the end of the experiment by determining the efficiency of the separation obtained in each vessel.

Vessels 3 and 7 did not present free water formation, nor has the process of gravitational sedimentation initiated. Whilst in vessels 1 and 5, in which IL was added, one notes the formation of free water and efficiencies of at least 30%.

Table 1 below lists the initial and final water content and separation efficiency (SE %) obtained in Example 1 for the separate vessels, designated as FR.

TABLE 1

|         | WATER CONTENT % | SE %  |
|---------|-----------------|-------|
| INITIAL | 31.7 (t = 0)    |       |
| FR-1    | 19.8            | 37.5  |
| FR-3    | 31.6            | 0.0   |
| FR-5    | 13.8            | 56.5  |
| FR-7    | 31.8            | 0.0   |

Figure 2:
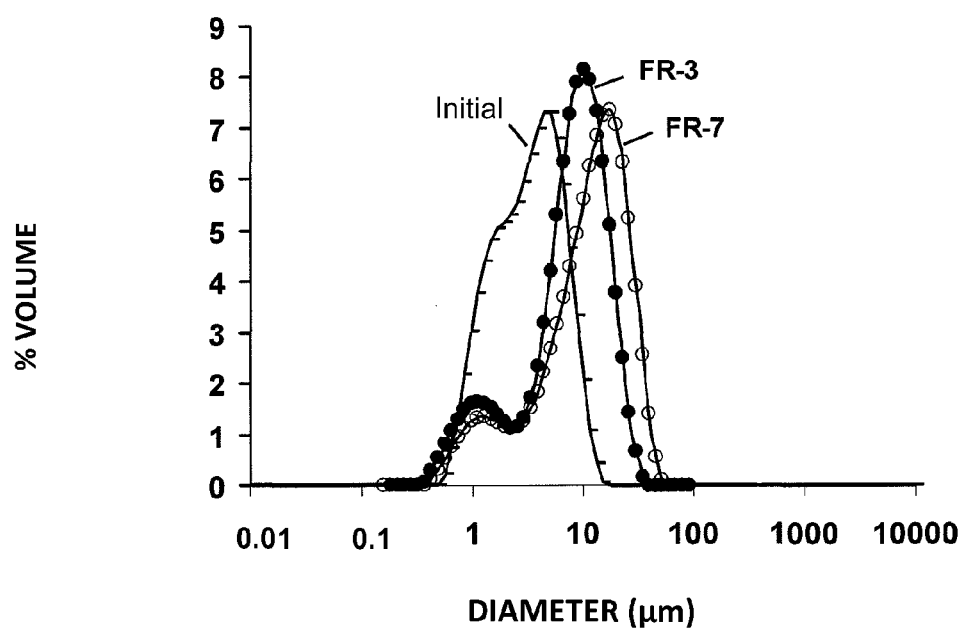
FIG. 2 demonstrates the droplet size distribution of the initial emulsion and emulsion sampled at the top of vessels 3 and 7 after microwave treatment (with no IL added) for Example 1.

FIG. 2 presents the proplet Size Distribution (DSD) of the initial emulsion and non-resolved emulsions located in vessels 3 and 7 after treatment via microwaves. Note in samples 3 and 7 the start of the coalescence process via evolution of the distribution in terms of larger droplet sizes. However, this coalescence was relatively smooth and was not sufficient to result in the formation of droplets with sufficiently high diameters to gravitationally sediment during the process. In this respect, the emulsion may be considered sufficiently stable since even the application of microwaves was not effective for starting the formation of free water.

It should also be noted that the concentration of IL used in these experiments was at the lower limit of the range of concentration quoted above, employed in research which led the Applicants to develop this process, similar to the range of that employed with demulsifiers. The effect of the addition of these low concentrations of IL along with the microwaves clearly promotes an increase in the break-up efficiency of the emulsion due to synergic effects.

Example 2

In Example 2, the system of microwave and conventional heating was used as well as omimBF4 ionic liquid, mixed manually and the addition of IL solubilized in benzene and distilled water as the dispersion phase of the emulsion.

The ionic liquid was inserted into two of the samples placed in the microwave reactor as with the conventional heating system. The synthesized emulsion in this test presents the following initial properties: water content=32.9% and D (0.5)=3.1 μm. Processing time was 30 minutes.

The heating curves given by the infrared and gas expansion sensors of the microwave reactor throughout this Example are similar to those illustrated in FIG. 1, with the increase in the temperature of the IR sensor of vessels 1 and 5 showing the start of the process of free water formation due to the addition of IL.

These results are confirmed by the data listed in Table 2 below, in which the initial water content and efficiencies specified in each vessel are presented. For vessels with the addition of IL, one notes the formation of free water and vessels containing emulsion with no added IL present no free water formation or the start of gravitational sedimentation.

TABLE 2

|              | WATER CONTENT % | SE %  |
|--------------|-----------------|-------|
| INITIAL      | 32.9 (t = 0)    |       |
| FR-1         | 22.3            | 32.4  |
| FR-3         | 33.0            | 0.0   |
| FR-5         | 14.2            | 57.0  |
| FR-7         | 32.4            | 0.0   |
| conventional | 4.4             | 0.0   |

Table 2 also presents the results obtained in the conventional heating test with the addition of IL in the same concentrations as those used in the samples subjected to dielectric heating. At the end of the conventional test, no formation of free water was observed; therefore the emulsion situated at the top of the vessel presents water content of 4.4% indicating that the process of gravitational sedimentation has begun.

Based on the results presented here, one can infer that the ionic liquid used acts as a demulsifying agent (with a still unknown action mechanism) in W/O emulsions. Note that this effect is not trivial once the tensoactive nature of the IL might induce an increase in the stability of the W/O emulsion.

Another aspect which may be concluded from the data of Table 2 is that the demulsifying effect of the IL is intensified with microwave radiation, suggesting the combined application of IL and microwaves is a highly promising aspect in the breakup of W/O emulsions of petroleum.

Example 3

In view of the significant differences in the values of final water content obtained in vessels 1 and 5 placed in the microwave reactor in Examples 1 and 2 and considering that these might be attributed to the mixing methodology of the IL with a poorly effective emulsion (manual mixing system), tests in Example 3 were carried out in which the ionic liquid is homogenized using a mechanical disperser. In addition to this, in order to minimize the use of toxic substances, the IL was added as it was without being mixed with benzene. In this test, the microwave heating system was used as well as omimBF4 ionic liquid, in which the mixture was made with the help of a homogenizer and IL was added without any solvent and distilled water was used as the dispersion phase of the emulsion. The ionic liquid was added in two samples placed in the microwave reactor. The emulsion synthesized in this experiment had the following initial properties: water content=33.4% and D (0.5)=3.1 μm. Processing time was 30 minutes.

The power applied and heating curves given by the infrared and gas expansion sensors of the microwave reactor throughout the experiment of Example 3 are similar to those illustrated in FIG. 1, with the increase in temperature of the IR sensor of vessels 1 and 5 attesting to the start of the free water formation process due to the added IL.

Table 3 presents the initial water content and efficiency results observed in the samples. Again the samples with added IL presented free water formation and separation efficiencies of approximately 60%. Note that the two vessels with added IL present very similar efficiency results. In addition to this, vessels 3 and 7 show no free water formation or the start of the gravitational sedimentation process.

TABLE 3

|  | WATER CONTENT % | SE % |
|---|---|---|
| INITIAL | 33.4 |  |
| FR-1 | 13.0 | 61.0 |
| FR-3 | 33.0 | 0.0 |
| FR-5 | 12.5 | 62.6 |
| FR-7 | 34.0 | 0.0 |

Example 4

In Example 4, the system of microwave and conventional heating was used as well as the omimBF4 ionic liquid, which was mixed by means of a homogenizer and IL was added in the absence of solvent, the dispersed phase being distilled water.

The ionic liquid was added in two of the samples placed in the microwave reactor as in the conventional heating system. The synthesized emulsion in this test had the following initial properties: water content=33.3% and D (0.5)=3.2 μm. Processing time was 30 minutes.

The results of this test are in accordance with those found in the previous tests.

The addition of IL in the microwave system results in the breaking of the emulsion with efficiencies of around 50% and similar values in the two vessels used.

The samples treated with no added IL present only a light coalescence of water droplets from the dispersion phase.

Distribution of droplet sizes for the initial emulsion and non-resolved emulsion of vessels 3 and 7 was similar to that illustrated in FIG. 2.

Table 4 below presents the initial water content data and separation efficiency obtained in these experiments.

TABLE 4

|  | WATER CONTENT % | SE % |
|---|---|---|
| INITIAL | 33.3 (t = 0) |  |
| FR-1 | 16.5 | 50.4 |
| FR-3 | 33.8 | 0.0 |
| FR-5 | 14.8 | 55.7 |
| FR-7 | 34.7 | 0.0 |
| conventional | 23.8 | 0.0 |

Note that for the system submitted to conventional heating, the samples had no free water formation (SE=0); however the emulsion has already begun the process of gravitational sedimentation, presenting water contents below that of the initial level in the residual emulsion located at the top of the vessel. Again, the IL helps with the demulsifying of the system and its effect is accelerated by the action of the microwaves.

Example 5

Example 5 illustrates the use of the microwave heating system using the omimBF4 ionic liquid and D942 demulsifier in two samples inserted into a reactor according to addition methodology (c) described above in this report.

Concentration of the D942 demulsifier in the emulsion was 0.056 μL/g. The dispersion phase employed in these emulsions was distilled water resulting in the following initial properties:

Experiment with D942: water content=32.2% and D (0.5)= 3.2 μm.

Experiment with omimBF4: water content=34.6% and D (0.5)=3.5 μm.

In the D492 test with added emulsifier a conventional heating test was performed with the aim of comparing the effect of conventional and microwave heating methods on the performance of the demulsifier.

As in the other Examples, the power applied and heating curves given by the infrared and gas expansion sensors of the microwave reactor throughout the test with omimBF4 ionic liquid and D942 A (in which A designates that the experiment is performed with no salts added to the emulsion) demonstrate the formation of free water in vessels 1 and 5 where a chemical additive is added by increasing the temperature of the IR sensor. The addition of the chemical additive is indispensable to formation of free water under the conditions employed in these tests. The result observed in the heating curves was verified at the end of the test by determining the efficiency of the separation obtained in each vessel. Vessels 3 and 7 had no free water formation in both tests; nor did the process of gravitational sedimentation begin. However, in vessels 1 and 5 with the chemical additive, the formation of free water and high efficiencies for both tests was noted.

Table 5 below lists the initial and final water content and separation efficiency for the separate vessels.

TABLE 5

|  | D942 A | | omimBF4 A | |
|---|---|---|---|---|
|  | Water Content % | SE % | Water Content % | SE % |
| INITIAL | 32.2 (t = 0) |  | 34.6 (t = 0) |  |
| FR-1 | 1.8 | 94.3 | 7.4 | 78.7 |
| FR-3 | 33.1 | 0.0 | 33.5 | 0.0 |
| FR-5 | 1.0 | 97.0 | 7.6 | 77.9 |
| FR-7 | 32.9 | 0.0 | 34.1 | 0.0 |
| conventional | 5.4 | 83.4 |  |  |

One notes in Table 5 above that the efficiencies attained in both the tests when chemical additives are used are very high, principally when the additive used is the D942 emulsifier. In this respect, the performance of the demulsifier is slightly superior. High efficiencies are also encountered in the conventional heating test using the D942 demulsifier based on the synthesized emulsion in the test with D942 A.

The efficiency of this test resulted in values of 83.4%, therefore slightly lower than those encountered in the test with microwave heating, demonstrating that the dielectric heating method accelerates the demulsifying action.

The droplet size distribution (DSD) of the initial emulsion and the non-resolved emulsions located in vessels 3 and 7 after microwave treatment for both tests, ionic liquid and demulsifier present very similar formats to those observed for FIG. 2, with the beginning of coalescence though insufficient to result in the formation of droplets with diameters sufficiently high enough for gravitational sedimentation during the process. In this respect, the emulsion may be considered sufficiently stable as even the application of microwaves is not effective at starting the formation of free water.

Example 6

Example 6 illustrates the use of the microwave heating system using the omimBF4 ionic liquid and D942 B demulsifier (in which B designates that the experiment was carried out with the additive in the presence of NaCl) in two samples inserted into a reactor using addition methodology (c) described above in this report. The dispersion phase employed in these emulsions was brine with an NaCl concentration of 50 g/L. In both tests, the same emulsion with the following initial properties was used: water content=31.5% and D (0.5)=2.8 μm. The concentration of the D942 emulsifier was 0.056 μL/g.

The power applied and heating curves obtained by the infrared and gas expansion sensors of the microwave reactor throughout the tests of Example 6 present a similar format to that of FIG. 1 and hence are not represented.

The results are confirmed by the data in Table 6 in which the efficiencies specified in each vessel are presented. Free water formation is noted in the vessels with IL added, while no free water formation nor the beginning of gravitational sedimentation is observed in the vessels containing emulsion with no IL added.

One notes in Table 6 that both the chemical additives, the IL and demulsifier produced similar demulsifying results in the tests performed. The use of brine as a dispersion phase in emulsions results in the formation of a more stable emulsion than the emulsions employed in earlier tests with no NaCl in the dispersion phase.

TABLE 6

|  | D942 A | | omimBF4 A | |
| --- | --- | --- | --- | --- |
|  | Water Content % | SE % | Water Content % | SE % |
| INITIAL | 31.5 (t = 0) |  | 31.5 (t = 0) |  |
| FR-1 | 7.0 | 77.7 | 4.9 | 84.3 |
| FR-3 | 31.6 | 0.0 | 31.5 | 0.0 |
| FR-5 | 10.3 | 67.0 | 10.5 | 66.7 |
| FR-7 | 31.2 | 0.0 | 31.5 | 0.0 |

Figure 3:
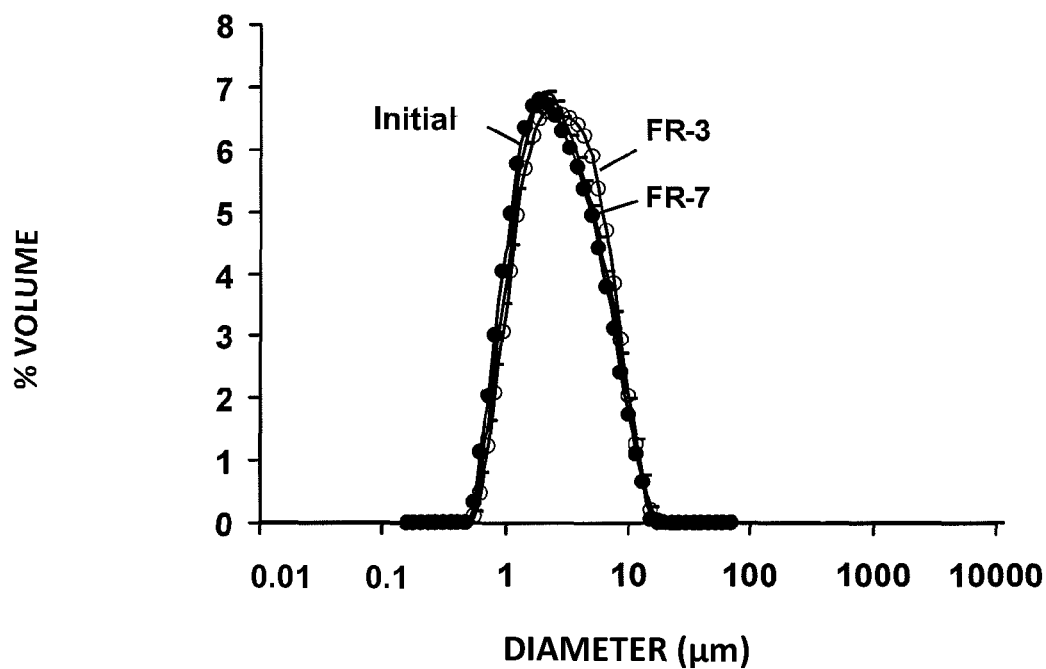
FIG. 3 demonstrates the droplet size distribution (DSD) of the initial emulsion and emulsion sampled at the top of vessels 3 and 7 after microwave treatment (with no IL added) for Example 6.
Figure 4:
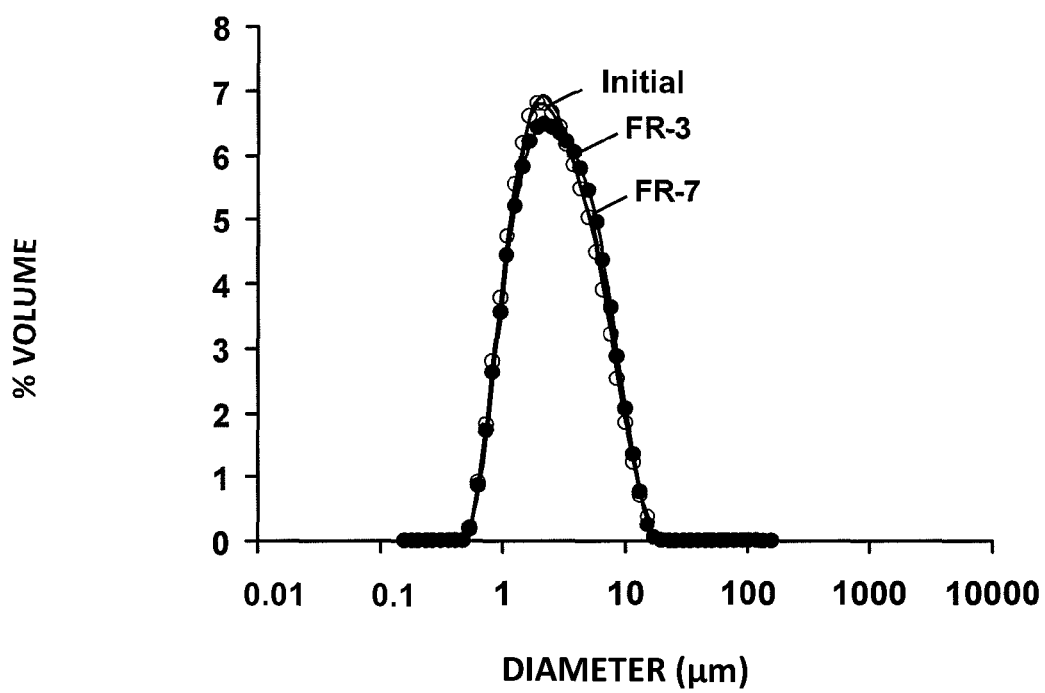
FIG. 4 demonstrates the droplet size distribution (DSD) of the initial emulsion and emulsion sampled at the top of vessels 3 and 7 after treatment (with no chemical additive added) in test D942 B of Example 6.

The increase in stability may be proven using the DSD (proplet Size Distributions) measured at the end of the breaking test for the samples inserted in vessels 3 and 7 (in this respect, see FIGS. 3 and 4). Note that the DSDs measured after the breaking tests via microwaves do not present any relevant changes when compared with the distribution of the initial emulsion which means that the coalescence process has not yet been started. Note that in the tests with emulsions with no NaCl in the dispersion phase, one observes the start of the coalescence phenomenon in the emulsions with no chemical additive. With the increase in the stability of the emulsion, the performance of the D942 B demulsifier on separation is lower, resulting in lower demulsifying efficiencies when compared with the D942 A test (emulsion with no NaCl in the dispersion phase). On the other hand, for these more stable emulsions, the test performed with addition of the ionic liquid presents performance equivalent to that observed in the omimBF4 A test (emulsion with no NaCl in the dispersion phase), also resulting in higher efficiency in the specific case of the sample added in vessel 1. These results demonstrate the improved performance of IL in emulsions in which the aqueous phase contains a proportion of salts.

Example 7

Example 7 illustrates the use of the system of microwave and conventional heating employing the omimPF6 ionic liquid, mixed with the help of a homogenizer and IL added with no solvent. The ionic liquid was added in two of the samples placed in the microwave reactor as in the conventional heating system. The dispersion phase used in this emulsion was distilled water. The synthesized emulsion in this test had the following initial properties: water content=50.9% and D (0.5)=2.5 μm. Processing time was 30 minutes.

The addition of IL in the microwave system resulted in the breaking of the emulsion with efficiencies of around 78% and similar values in the two vessels used.

The samples treated with no added IL had no formation of free water, though they did show a reduction in the water content at the top of the vessel indicating the start of gravitational sedimentation.

These results show that the synthesized emulsion is less stable than the emulsion used in the earlier tests due to the high water content incorporated in the emulsion. The increase in the number of droplets of the dispersion phase favors contact between the droplets and their subsequent coalescence. This way, droplets of a larger diameter are formed that are capable of sedimentation due to the action of gravitational forces.

Table 7 below presents the initial and final water content and separation efficiency data obtained in these experiments.

It is clear that for the system submitted to conventional heating, the samples present free water formation and the efficiency of the process is 70.0%, slightly lower than the efficiency encountered in the tests in which microwave irradiation is used. Again, the IL helps with the demulsifying of the system and its effect is accelerated by the action of the microwaves.

TABLE 7

|  | WATER CONTENT % | SE % |
| --- | --- | --- |
| INITIAL | 50.9 (t = 0) |  |
| FR-1 | 11.6 | 77.2 |
| FR-3 | 42.9(*) | 0.0 |
| FR-5 | 11.0 | 78.4 |
| FR-7 | 48.4(*) | 0.0 |
| conventional | 15.3 | 70.0 |

(*)Water content at top of non-resolved emulsion

Dielectric Heating Curves Of D942 Demulsifier

In order to determine whether the demulsifiers have heating rates equivalent to those observed for the ionic liquids, microwave heating tests of the samples of D942 emulsifier were carried out and compared with the curves calculated in earlier studies for water and ionic liquids.

The heating test consists of irradiation in the microwave cavity where the rotor was situated maintaining a constant power (1000 W and 500 W).

Figure 5:
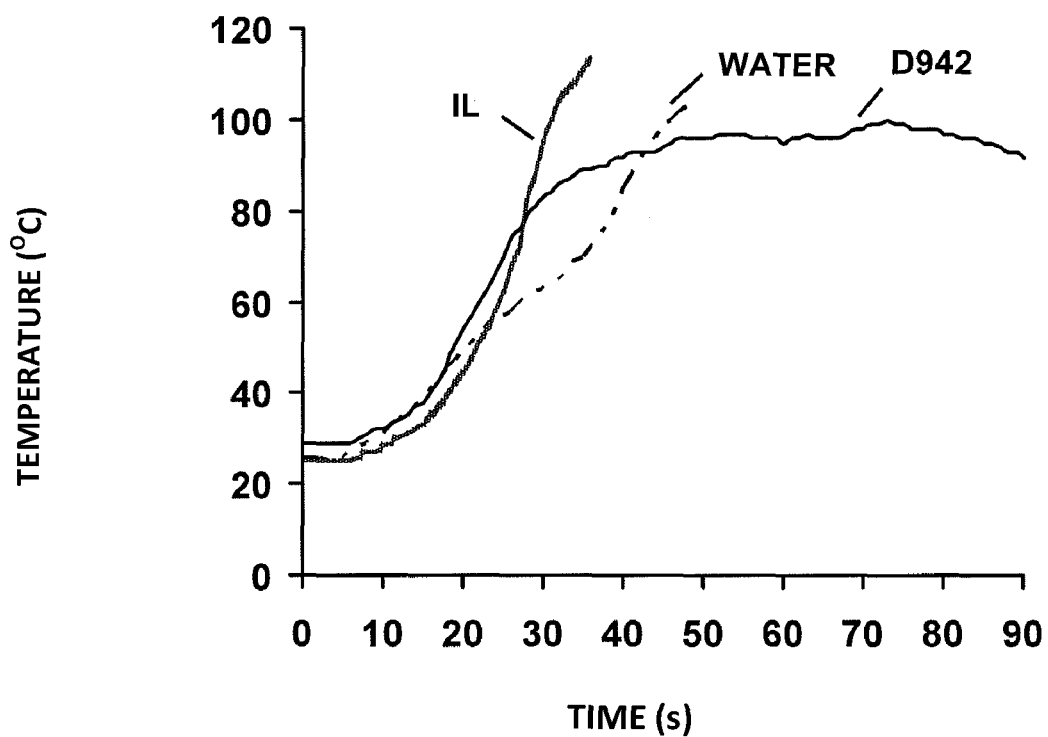
FIG. 5 demonstrates the water heating curves, IL and D942 for heating tests conducted under a constant power of 1000 W.
Figure 6:
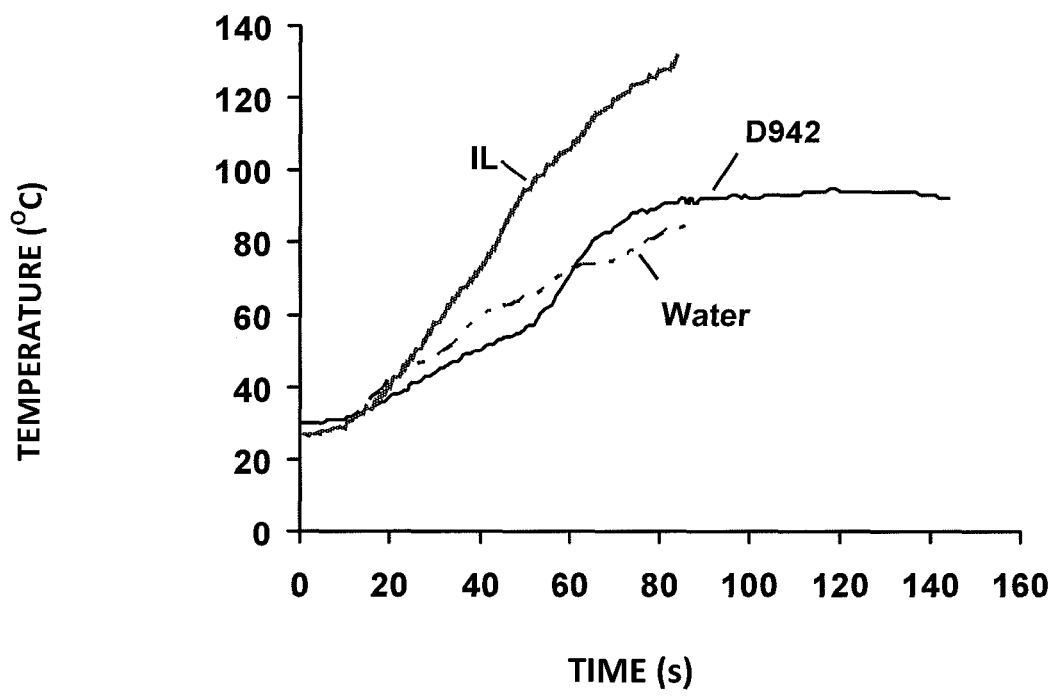
FIG. 6 demonstrates the water heating curves, IL and D942 for heating tests conducted under a constant power of 500 W.

The rotor was filled with a sample of 15 mL of demulsifier at position 1 and with samples of 15 mL of water at positions 3, 5 and 7. FIGS. 5 and 6 show the heating curves (temperature versus time) for the three components of interest: water, IL and D942.

Note in FIGS. 5 and 6 that the compound which presents higher heating rates in the temperature ranges studied is the IL. This result is witnessed primarily using the curves calculated under the constant power of 500 W.

In relation to the heating of the demulsifier, one can note a temperature limit of approximately 90° C. for both tests after which the system attains null heating rates. The result observed in the samples of the D492 demulsifier may have been caused by one of the solvents used in the solubilization of the demulsifier.

Another experimental condition which substantially influences the efficiency of the demulsifying is the temperature of the process.

Figure 7:
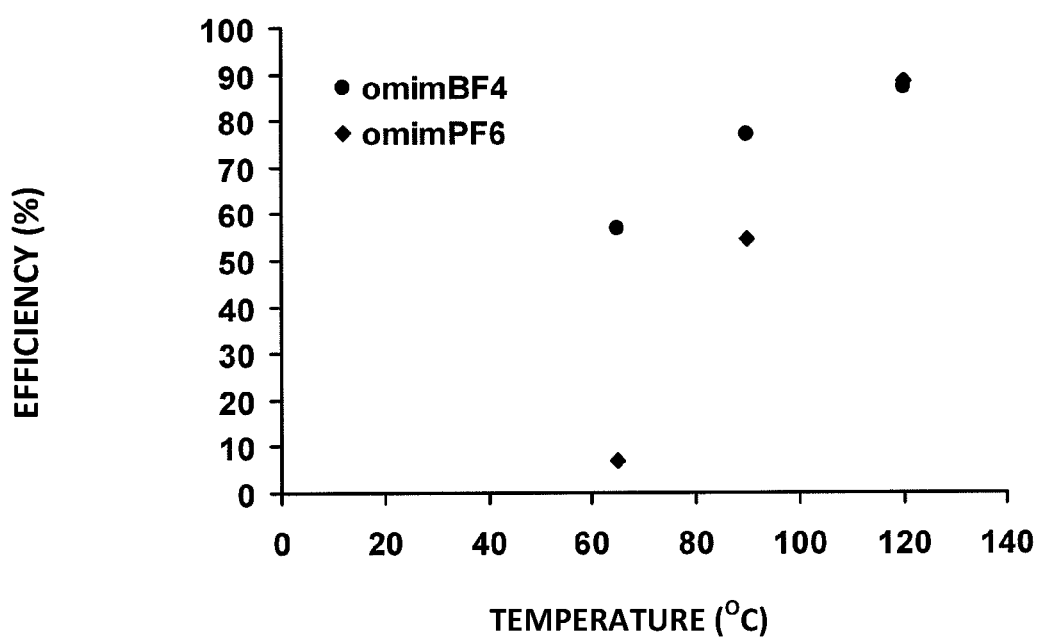
FIG. 7 presents a graph of the variation in the efficiency of the treatment using omimBF4 and omimPF6 under distinct processing temperatures.

FIG. 7 presents a graph of the results of tests for omimBF4 and tests for omimPF6 carried out at separate processing temperatures.

The conditions employed in these tests are: processing time of 30 minutes, water content of the emulsion close to 30%, dispersion phase of distilled water, average droplet size of around 3 μm and a fast heating profile. It is worth pointing out that the heating profile specified enables the desired temperature in each test to be reached in up to 3 minutes, even for tests conducted at the higher temperature of 120° C.

One observes from FIG. 7 the increase in the efficiency of the treatment with the temperature of the process. This effect is especially intensified for tests performed with omimPF6. The influence of the temperature observed in these tests may be explained by the fact that the coalescence and water droplet sedimentation rates as well as the viscosity of the oil phase and diffusion speed of the ionic liquids at the interphase must be widely influenced by temperature, resulting in a faster demulsifying kinetic when higher temperatures are applied.

The present invention is susceptible to various modifications and alternative means, and specific examples thereof have been shown by way of example as described in detail. It should be understood, however, that the present invention is not to be limited to the particular devices or methods disclosed, but to the contrary, the present invention is to cover all modifications, equivalents, and alternatives falling within the spirit and scope of the claims.

What is claimed is:

1. A process for treating water/oil ("W/O") emulsions, comprising:
   (a) adding, by stirring, a formula $C^+A^-$ salt that is in a liquid state at a temperature of 150° C. or less, the formula $C^+A^-$ salt being used as such or dissolved in water or in an organic solvent, to a W/O emulsion containing from 0.5% to 85% per volume of water as the dispersion phase in an oily phase, to obtain a mixture of the formula $C^+A^-$ salt and W/O emulsion;
   (b) heating the mixture obtained in (a) by applying microwaves using a device containing a microwave emitter issuing radiation in the frequency between 1,000 MHz and 300,000 MHz for a period of from 5 seconds to 120 minutes at a temperature of from 25° C. to 270° C. under a pressure of from 0.5 bar to 200 bar to demulsify the mixture; and
   (c) separating the mixture heated in (b) using separator equipment in two distinct phases: a first phase containing water and a second phase containing oil,
   wherein in the formula $C^+A^-$ salt, the $A^-$ is an anion and the $C^+$ is a cation, and
   the cation $C^+$ has a hydrophobic alkyl chain attached to a cationic group.

2. The process in accordance with claim 1, wherein the droplet size of the W/O emulsion is from 0.01 μm to 1000 μm.

3. The process in accordance with claim 1, wherein the oily phase of the W/O emulsion comprises mineral oily phases.

4. The process in accordance with claim 1, wherein the oily phase of the W/O emulsion comprises crude oil.

5. The process in accordance with claim 1, wherein the oily phase of the W/O emulsion comprises a synthetic oil.

6. The process in accordance with claim 1, wherein the aqueous phase of the W/O emulsion comprises a saline solution containing from zero (0) to 280,000 mg/L of salts.

7. The process in accordance with claim 1, wherein the oily phase of the W/O emulsion comprises a vegetable oil or animal oil.

8. The process in accordance with claim 1, wherein the formula $C^+A^-$ salt comprises an ionic liquid of:
   heteroaromatic cations selected from the group consisting of n-alkylpyridinium, 1,3-dialkyl-imidazolium, 1,2,3-trialkyl-imidazolium, 1,1-dialkyl-piperidine and 1,1-dialkyl-pyrrolidinium, or organic cations selected from the group consisting of trialkylsulfonium, tetraalkylammonium and phosphonium, and
   inorganic or organic anions selected from the group consisting of $Cl^-$, $Br^-$, $I^-$, $BF_4^-$, $PF_6^-$, $NO_3^-$, $(CF_3SO_2)_2N^-$, $SbF_6^-$, $CF_3SO_3^-$, $HSO_4^-$, $CH_3SO_3^-$ and $SCN^-$ and based on sulfates, sulfonates, phosphates, acetates and nitrates.

9. The process in accordance with claim 1, wherein the ionic liquid comprises tetrafluoroborate ($BF_4$) of 1-n-octyl-3-methylimidazolium and/or hexafluorophosphate ($PF_6$) of 1-n-octyl-3-methylimidazolium.

10. The process in accordance with claim 1, wherein the concentration of the formula $C^+A^-$ salt in the emulsion is from 0.01 μL/g to 100 μL/g.

11. The process in accordance with claim 1, wherein the formula $C^+A^-$ salt is added in mixture with one or more ionic liquids (other than the formula $C^+A^-$ salt) and/or one or more demulsifiers.

12. The process in accordance with claim 1, wherein the formula $C^+A^-$ salt is added to the W/O emulsion without the formula $C^+A^-$ salt being mixed with a solvent.

13. The process in accordance with claim 1, wherein the formula $C^+A^-$ salt is dissolved in a solvent selected from the group consisting of an aromatic solvent, an aliphatic solvent or a hydroxylated organic solvent.

14. The process in accordance with claim 13, wherein the solvent is benzene.

15. The process in accordance with claim 13, wherein the proportion of the formula $C^+A^-$ salt to the solvent is from 1:0.01 to 1:100 per volume.

16. The process in accordance with claim 1, wherein the formula $C^+A^-$ salt is recovered for reuse after separating the mixture in (c).

17. The process in accordance with claim 1, wherein the heating is conducted using electricity.

18. The process in accordance with claim 1, wherein the process is performed in a batch process.

19. The process in accordance with claim 1, wherein the process is performed in a continuous process.

20. The process in accordance with claim 1, further comprising one of centrifuging, gravitational separation, ultrasound, hydrocyclones, electrostatic separation, filtration, separation via membrane or a combination of these techniques.

21. The process in accordance with claim 1, wherein the oily phase of the W/O emulsion comprises petroleum and/or distillates.

22. The process in accordance with claim 1, wherein the solvent comprises an alcohol and water.

* * * * *